United States Patent [19]

Gunning, III et al.

[11] Patent Number: 4,508,964
[45] Date of Patent: Apr. 2, 1985

[54] ELECTRO-OPTICALLY TUNED REJECTION FILTER

[75] Inventors: William J. Gunning, III, Newbury Park; John M. Tracy, Thousand Oaks, both of Calif.

[73] Assignee: Rockwell International Corporation, El Segundo, Calif.

[21] Appl. No.: 426,348

[22] Filed: Sep. 29, 1982

[51] Int. Cl.$^3$ .............................................. G02F 1/03
[52] U.S. Cl. ................................. 250/201; 250/226; 356/352; 356/416; 350/387
[58] Field of Search ........... 250/201, 226, 205, 213 R; 350/385, 387; 356/352, 416, 419; 372/28, 32

[56] References Cited

U.S. PATENT DOCUMENTS

| | | | |
|---|---|---|---|
| 3,699,347 | 10/1972 | Buchan et al. | 250/213 R X |
| 3,700,902 | 10/1972 | Buchan | 250/201 |
| 4,095,099 | 6/1978 | Ehrenhaft | 350/387 X |
| 4,314,743 | 2/1982 | Rast . | |

OTHER PUBLICATIONS

De Angelis, et al., Electro–Optic Interference Filter Light Modulator, Proc. IEEE, vol. 51, p. 1258, (1963).
Smith, et al., Electrooptic Nonlinear Fabry–Perot Devices, IEEE J. Quant. Mech., vol. QE-14, No. 3, p. 207, (Mar. 1978).
Sohler, Optical Bistable Device as Electro-optical Multivibrator, Appl. Phys. Lett. 36(5), p. 351, (Mar. 1, 1980).

*Primary Examiner*—Edward P. Westin
*Attorney, Agent, or Firm*—H. Fredrick Hamann; Craig O. Malin; John J. Deinken

[57] ABSTRACT

Disclosed is an apparatus for removing electromagnetic energy at a wavelength λ from a beam of electromagnetic energy. Included is an electro-optically tunable Fabry-Perot filter, with an electro-optic crystal having parallel incident and exit surfaces, a first transparent electrode on the incident surface, a second transparent electrode on the exit surface, an incident reflecting layer, and an exit reflecting layer. A detector produces an electrical signal in response to the electromagnetic energy transmitted by the filter. A lock-in amplifier receives the electrical signal and outputs to a control amplifier which also receives as an input a source of alternating current. A high voltage amplifier receives the output of the control amplifier and applies its output across the electro-optic crystal.

9 Claims, 5 Drawing Figures

4,508,964

ELECTRO-OPTICALLY TUNED REJECTION FILTER

GOVERNMENT RIGHTS

The Government has rights in this invention through a contract with the United States Army.

BACKGROUND OF THE INVENTION

This invention relates to tunable optical filters utilizing electro-optic materials.

A number of uses has been developed for solid state spectral filters whose transmission characteristics can be controlled solely by the application of an electric field. Research into such devices was based on the premise that the electro-optic effect in certain crystals could be employed to replace the mechanical tuning sections of a birefringent interference filter. The initial motivation for tunable filter development came from several potential applications, ranging from color projection systems to astronomical telescopes, for which simultaneous spatial and spectral resolution was required. Subsequently, the need for remote sensing capabilities and, in particular, space-based platforms, has motivated the development of devices which are both compact and free of the difficulties inherent in mechanically tuned spectral filters. In many of these applications restrictions on size, weight, and power consumption have made the use of compact, solid state tunable filters highly desirable. Tunable filters are incorporated in these systems to enhance the probability of target detection by identification of spectral signatures and to eliminate undesirable optical signals from the sensor.

Optical filters can be spectrally tuned by the use of optical materials whose refractive indices are modified by the application of an electric field. Such materials include those which exhibit linear (Pockels) or quadratic (Kerr) electro-optic effects in which an index of refraction change results from a non-linear response of the crystalline material. In addition, liquid crystal materials, in which large index changes result from an electric field-induced rotation of optically anisotropic molecules, may be employed. Among the tunable filter designs available in the art are electro-optic birefringent interference filters, Fabry-Perot devices, and electro-optic coupled-wave filters. These filters can be employed as passband filters, in which a narrow band of wavelengths is transmitted through the filter and the remainder of the incident light beam is rejected, or as stopband filters, which pass all wavelengths except for a narrow band of light. In the passband configuration, such filters can be made highly efficient, so that nearly 100% of the light at the desired wavelength is transmitted through the filter. Where it is necessary to exclude a particular wavelength, however, these filters are not as successful, since the percentage of light excluded by such a filter at stopband wavelengths cannot readily be made close to zero. Consequently, a technique which would permit the highly efficient separation of a particular wavelength from a beam of light would be welcome in the optical filter art.

SUMMARY OF THE INVENTION

It is a general objective of this invention to provide an improved technique for removing electromagnetic energy at a particular wavelength $\lambda$ from a beam of electromagnetic energy.

In one embodiment, an apparatus constructed according to this invention includes an electro-optically tunable interference filter for intercepting the beam, with the transmission of the filter controlled by the application of an electrical potential to the filter. A detector produces a signal in response to the electromagnetic energy transmitted by the filter, and a control circuit adjusts the electrical potential applied to the filter in accordance with the signal to maximize the transmission of electromagnetic energy at the wavelength $\lambda$.

In a more particular embodiment, the filter is a Fabry-Perot filter with an electro-optic crystal having a non-vanishing linear electro-optic coefficient, such as Z-cut $LiNbO_3$. The control circuit includes a lock-in amplifier for receiving an electrical signal from the detector as an input. The output of the lock-in amplifier and a source of alternating current are supplied as inputs to a control amplifier, the output of which is applied to a high voltage amplifier. The output of the high voltage amplifier is then applied to the filter.

The technique of this invention also includes a method of sensing electromagnetic energy at a wavelength $\lambda$ from a beam of electromagnetic energy. An electro-optically tunable Fabry-Perot filter is placed in the path of the beam and a source of electrical potential is applied to the filter so that 2nd Cos $\theta = m\lambda$, where n is the refractive index of the filter, d is the thickness of the filter, $\theta$ is the internal angle of refraction of the beam in the filter, and m is an integer.

BRIEF DESCRIPTION OF THE DRAWINGS

Additional objectives, features, and advantages of the invention are detailed below in conjunction with the drawings, where.

DETAILED DESCRIPTION OF THE INVENTION

The present invention provides an improved technique for eliminating an intense narrowband optical signal from a broadband background. This new approach is particularly versatile because actual knowledge of the narrowband wavelength is not required.

Figure 1:
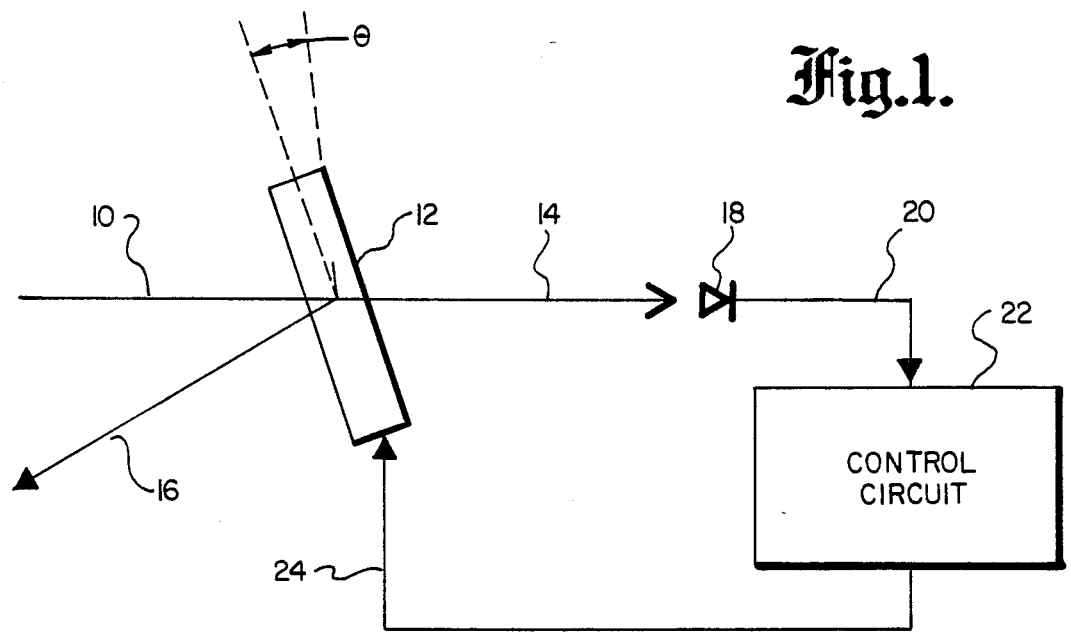
FIG. 1 is a schematic illustration of an apparatus for removing electromagnetic energy at a particular wavelength from a beam of electromagnetic energy.

FIG. 1 provides a schematic illustration of an apparatus for removing electromagnetic energy at a particular wavelength $\lambda$ from an incoming beam 10. The beam 10 is intercepted by an electro-optically tunable interference filter 12, which is placed so that the beam 10 makes an internal angle $\theta$ with the plane of the filter. The filter separates the beam 10 into a transmitted portion 14 and a reflected portion 16, with the transmission properties of the filter 12 being controllable by the application of an electrical potential to the filter. The transmitted portion 14 of the incoming beam impinges on a detector 18, which responds by producing a signal 20. Control circuit 22 receives the signal 20 and adjusts an electrical potential which is applied to the filter 12, as indicated by the line 24. In this manner, the signal 20, control circuit 22, and line 24 cooperate as a feedback loop to maximize the transmission through the filter 12 of light at the wavelength λ. The reflected portion 16 may thus be efficiently separated from a selected narrow band component at the wavelength λ, the reflected portion then being available for further processing.

A number of different filter designs are available for use as tunable filters in a narrowband rejection device. The electro-optic Fabry-Perot filter, however, is the filter of choice for the preferred embodiment of the present invention because of its potential for rapid tuning speed, high rejection efficiency, and relative ease of fabrication. A Fabry-Perot filter is a comparatively simple structure consisting of two plane parallel partial reflectors separated by a suitable transparent medium. When the optical path length between the reflecting surfaces is an integer number of half waves, the structure becomes optically resonant, with a zero electric field intensity at the boundaries and energy coupled through the filter, ideally without loss. Other wavelengths not meeting the resonant condition are reflected.

The condition for maximum transmission in the Fabry-Perot filter is given by $$2nd \cos\theta = m\lambda \tag{1}$$

where n is the index of the medium within the cavity, d is the mirror separation, $\theta$ is the angle of incidence within the cavity medium, m is an integer, and λ is the free space wavelength. The spectral transmission T is $$T = 1/(1 + F \sin^2 \delta/2) \tag{2}$$

where $$\delta/2\pi = (2nd \cos\theta)/\lambda$$

and $$F = 4R/(1-R)^2.$$

R is the reflectance of the mirrors, which are assumed to have identical properties. The spectrum for this filter consists of a series of transmission peaks at wavelengths and angles of incidence which satisfy equation (1). The spacing between these peaks is referred to as the free spectral range (FSR) and is given approximately by $$FSR = \lambda^2/2nd \tag{3}$$

As the reflectance of the Fabry-Perot mirrors is increased, the width of the individual transmission peaks will be reduced.

The finesse, F which describes the ratio of the FSR to the band-width, is given by $$F = \pi \sqrt{R}/(1-R) \tag{4}$$

Figure 2:
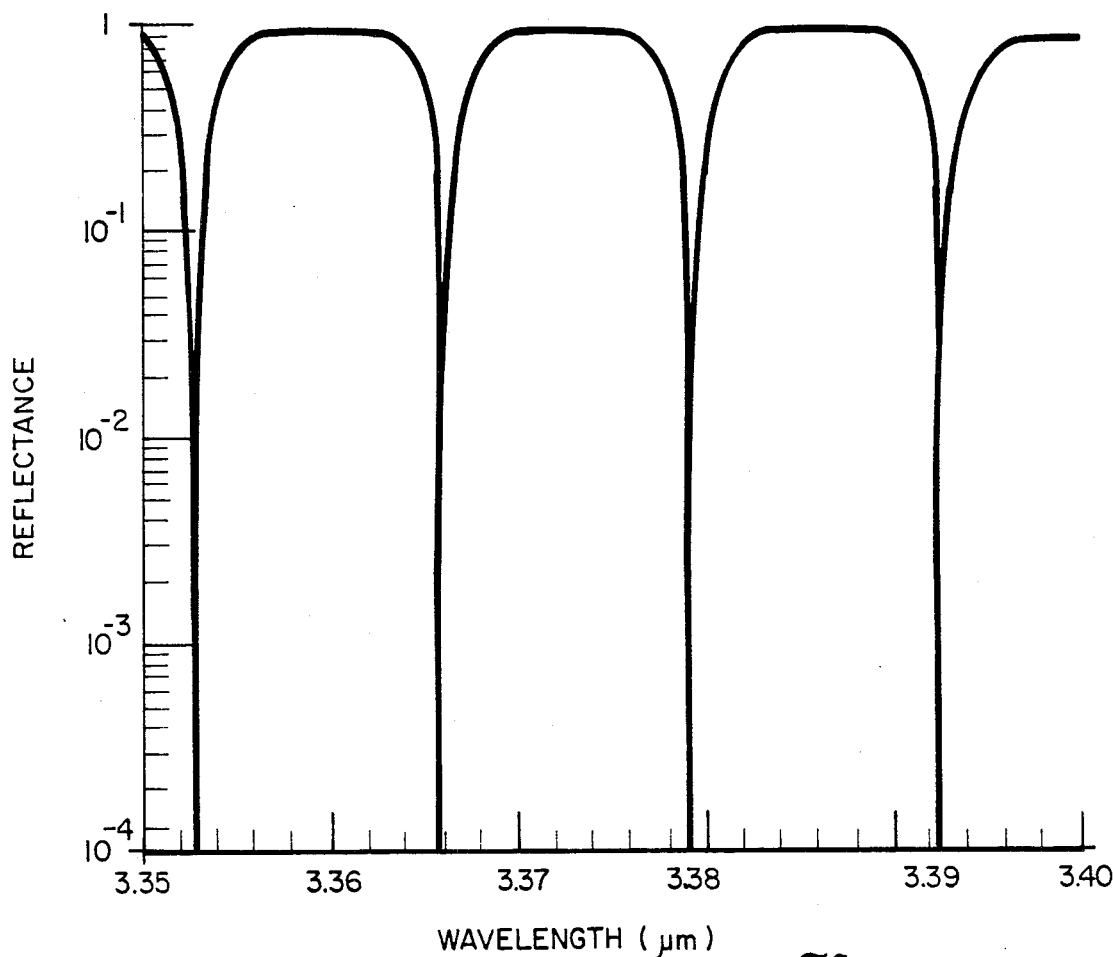
FIG. 2 is a plot of the calculated reflectance for a Fabry-Perot filter.
Figure 3:
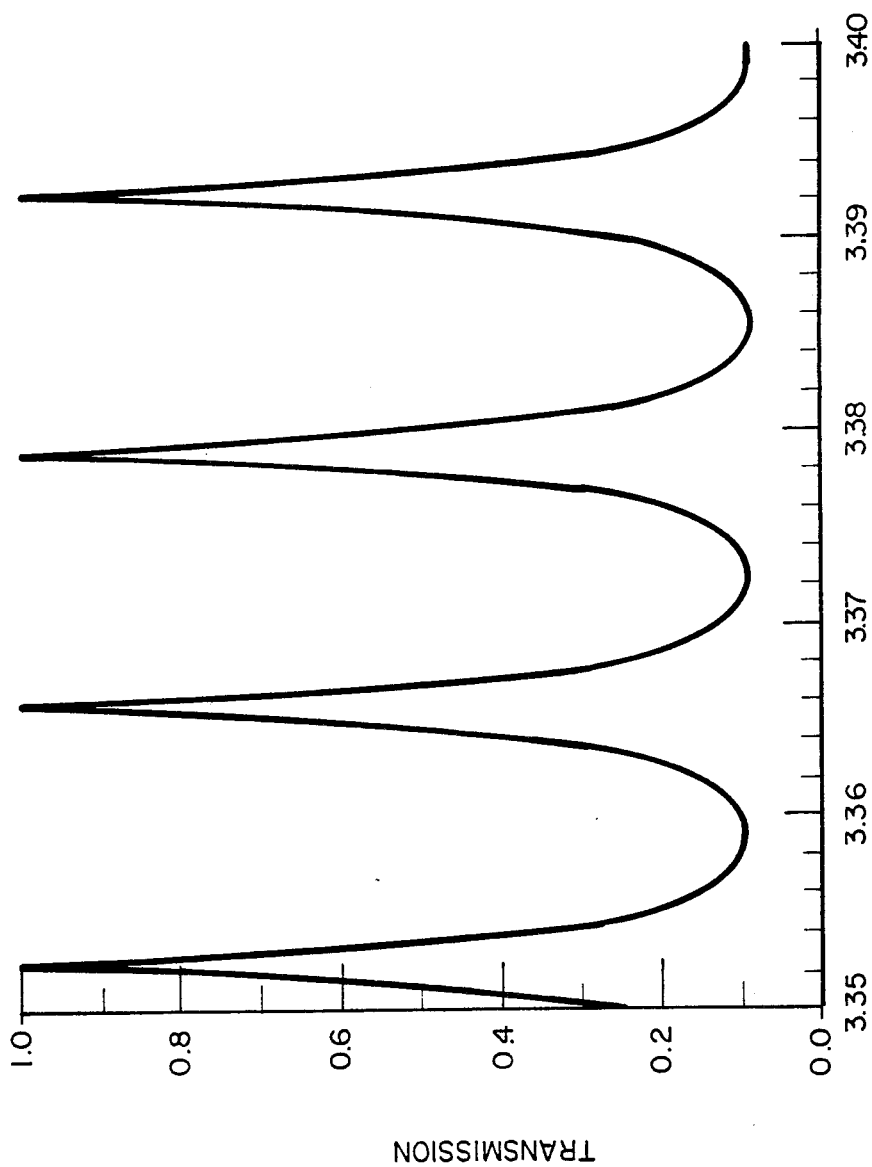
FIG. 3 is a plot of the calculated transmission for a Fabry-Perot filter.

In the absence of absorption in the cavity or the reflectors, the peak transmission will be 100%, while the reflectance, integrated over a broadband spectrum, will be determined by $F$. FIG. 2, for example, is a plot of the calculated reflectance for a Fabry-Perot filter 200 μm thick with a finesse of 5 and an FSR of 135 Å, while FIG. 3 is a plot of the calculated transmission spectrum for the same filter. Therefore, for a Fabry-Perot filter to be used effectively for band rejection, the narrowband signal must be rejected by transmission into an absorber, while the broadband signal may be substantially reflected for collection and analysis by an optical sensor. Over the broadband spectrum, the intensity of the reflected signal will be modulated by the presence of the transmission bands. The band structure, however, will typically occur on a scale which is much finer (~100 Å or less) than that of any significant signal structure which would be found in a typical optical sensor system.

Figure 4:
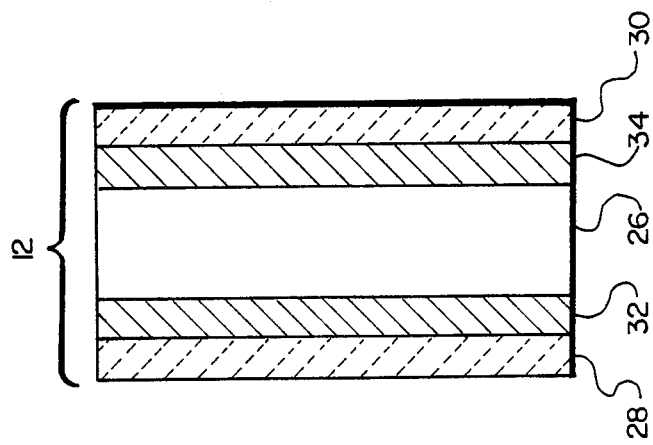
FIG. 4 is a cross-sectional side view of the electro-optic filter shown in FIG. 1.

The filter of the present invention is tuned by the application of a DC voltage across the filter. FIG. 4 is a cross-sectional side view of the filter 12 of FIG. 1, which includes an electro-optic crystal 26, sandwiched between an incident reflecting layer 28 and an exit reflecting layer 30. A pair of transparent electrodes 32 and 34 contact opposite faces of the crystal so that an electric potential can be applied across the crystal. Linear electro-optic materials having specific crystal symmetries must be used in such a design. In order for the filter to operate without polarizers, for example, the direction of light propagation must be along the uniaxial (C−) axis, where the ordinary and extraordinary modes are degenerate. The direction of the applied electric field must also be in this direction, so that the polarization mode degeneracy is not lifted. This condition alone is not sufficient, since the degeneracy can still be lifted in this geometry for certain crystal classes. In general, when an electric field is applied to a noncentrosymmetric crystal, the refractive index ellipsoid is represented by $$\sum_{ijk} (1/n_{ij}^2 + r_{ijk} E_k) x_i x_j = 1 \tag{5}$$

where $r_{ijk}$ are the linear electro-optic coefficients, $x_i$ and $x_j$ are the refractive indices, and the $E_k$ are the applied electric fields. By symmetry, $r_{ijk} = r_{jik}$, so that ij subscripts are usually contracted using the equivalent notation 1=11, 2=22, 3=33, 4=23, 5=13, and 6=12. In general, many of the $r_{mk}$ are identically zero, as dictated by crystal symmetry.

If an electric field is applied along the C−(3) axis and light propagates in the same direction, the index ellipsoid cross section becomes $$x_1^2(1/n_1^2 + r_{13}E_3) + x_2^2(1/n_1^2 + r_{23}E_3) = 1 \tag{6}$$

If $r_{13} = r_{23}$, then the field induced change in the refractive index will be independent of the polarization direction. Assuming the index change Δn to be small, $$\Delta n = -n_1^3 r_{13} E_3/2 \tag{7}$$

Among the various crystal classes which have nonvanishing and equal coefficients $r_{13}$ and $r_{23}$, the possible groups are then 4, 4 mm, 3, 3 m, 6, or 6 mm. These groups include most of the ferroelectric oxides, such as $LiNbO_3$ and $Sr_xBa_{1-x}Nb_2O_6$.

The voltage required to tune a Fabry-Perot filter through one complete FSR is that voltage which induces a change of the optical path length by one half wave. This half wave voltage is given by $$V_\pi = \pm \lambda/2n^3 r_{13} \tag{8}$$

An important feature of the present invention is the capability for automatically tuning to the wavelength of a narrowband source. This feature is possible because of the non-zero transmission of a low finesse Fabry-Perot filter for any wavelength within its FSR and because of the use of closely spaced transmission peaks. A detector sensing the transmission of the filter can detect the presence of an intense narrowband source even if the filter is not exactly tuned to the wavelength of that source. By modulating the voltage applied to the filter and detecting the phase of the filter's transmission, the control electronics may tune the filter to maximize the transmitted signal. This approach, which eliminates the need to determine the wavelength of the source, also avoids the strict temperature control requirements which are usually encountered when operating such filters.

The transmission characteristics of an electro-optic Fabry-Perot filter are given by a function $T(\lambda, V)$ where $\lambda$ is the wavelength and V is the voltage applied to the etalon. If the filter is illuminated by a monochromatic source $\lambda_L$, then the transmission of the filter in the vicinity of a transmission maximum is a function of voltage, which can be expanded as $$T(\lambda_L, V) = T(\lambda_L, V_o) + (\partial T/\partial V)(v - V_o) \quad (9)$$
$$+ \tfrac{1}{2}(\partial^2 T/\partial V^2)(v - V_o)^2 + \ldots$$

If the voltage is given by $$v = V_o + a \sin \omega t \quad (10)$$

where $a << V_o$, then $T(\lambda_L, V)$ becomes $$T(\lambda_L, V) = T(\lambda_L, V_o) + (\partial T/\partial v) a \sin \omega t \quad (11)$$
$$+ a^2/4 [1 - \cos(2\omega t)](\partial^2 T/\partial V^2) + \ldots$$

In the frequency domain, as can be seen from Equation 11, the transmission includes a component at frequency $\omega$ with amplitude $a(\partial T/\partial V)$ and a second harmonic with frequency $2\omega$ and amplitude $a^2/4(\partial^2 T/\partial V^2)$. Thus, by monitoring the first and second harmonic components of the transmission, it is possible to determine the first and second derivatives, with respect to voltage, of the transmission function. By determining the voltage which makes $\partial T/\partial V = 0$ and $\partial^2 T/\partial V^2 < 0$, the filter transmission at the monochromatic source wavelength $\lambda_L$ can be maximized.

Figure 5:
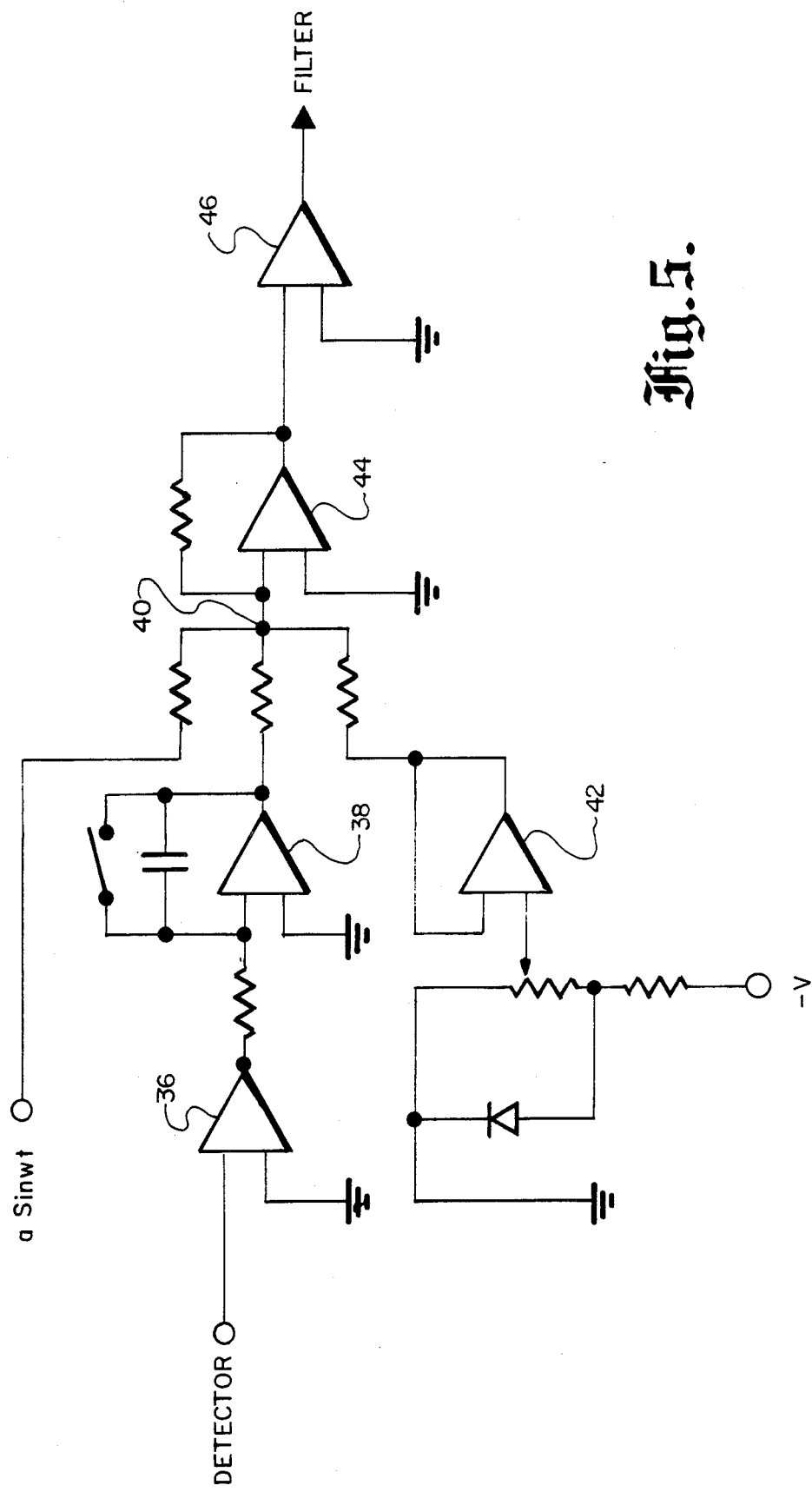
FIG. 5 is a schematic diagram illustrating a particular embodiment of the control circuit shown in FIG. 1.

Illustrated in FIG. 5 is a particular embodiment of the control circuit 22 of FIG. 1 which uses the first derivative signal to generate a DC correction signal. In this approach, the signal from the detector 18 (shown in FIG. 1) is applied to a lock-in amplifier 36, which is tuned to the frequency $\omega$. The output of the amplifier 36 provides the first derivative $\partial T/\partial V$, which is integrated by an operational amplifier 38 and summed, at junction 40, with a DC bias signal from an amplifier 42 and an AC modulation $a \sin \omega t$.

Depending upon the sign of the first derivative, a signal integrator 44 generates a correction signal which is used as the input to a high voltage amplifier 46, which in turn is connected to the electrodes of the filter 12 (shown in FIG. 1). The correction signal continues to increase or decrease, depending upon the sign of $\partial T/\partial V$, until $\partial T/\partial V$ becomes zero, and the voltage is then maintained by this circuitry at a constant level. In this manner, the circuit compensates automatically for any shift from the transmission maximum, whether caused by a change in the source wavelength or a change in the filter temperature. The presence of a broadband signal should not have a significant effect on the performance of this circuit, assuming that the broadband signal structure is not within the resolution of the filter. The finesse of the filter should be made relatively low in order to provide sufficient transmission of a narrowband signal at any point within the FSR of the filter.

In one particular example of a filter which was constructed according to the present invention, an electro-optic crystal was fabricated from $LiNbO_3$ with a thickness of 0.5 mm and measuring 15 mm on each side. A three layer germanium and zinc sulfide quarter-wave stack of coatings was applied to each face of the crystal by electron beam deposition to provide both the reflecting layers and the transparent electrodes. Gold leads were attached using silver filled epoxy, and the filter was mounted into a glass filled epoxy insulating holder with a small amount of silicon rubber cement. This device was used to demonstrate the concept of this invention for a narrowband source at a wavelength of 3.39 μm in the infrared. Another device, using silver reflectors, was used to demonstrate the operation of this filter at 6328 Å in the visible spectrum.

In conclusion, the rejection filter of this invention is of a relatively simple design, with straightforward construction. Among the outstanding advantages of this filter are its immunity to thermal variations and the lack of a requirement for a mechanically stable enclosure. In addition, complicated tuning algorithms are not required and it is not necessary to determine the wavelength of the narrowband source which is to be rejected. Although the particular embodiments discussed above are exemplary, modifications and additional embodiments may be apparent to those skilled in the art. Consequently, the full scope of the invention should be measured by the claims which follow.

What is claimed is:

1. An apparatus for automatically removing intense, narrowband electromagnetic energy centered at an unknown wavelength $\lambda$ from a broadband beam of electromagnetic energy, comprising:
    an electro-optically tunable interference filter for intercepting the beam, the transmission of said filter being controllable by the application of an electrical potential to said filter;
    a detector for producing an electrical signal in response to the electromagnetic energy transmitted by said filter; and
    a control circuit for calculating the partial derivative of said signal with respect to said applied potential and adjusting the applied potential to minimize the absolute value of said partial derivative and thereby maximize the transmission of electromagnetic energy at the wavelength $\lambda$ by the filter.

2. The apparatus of claim 1, wherein said filter further comprises a Fabry-Perot filter, including:
    an electro-optic crystal having parallel incident and exit surfaces;
    a first transparent electrode on said incident surface;
    a second transparent electrode on said exit surface;
    an incident reflecting layer on said incident surface; and
    an exit reflecting layer on said exit surface.

3. The apparatus of claim 2, wherein said crystal further comprises an electro-optic material having a non-vanishing $r_{13}$ linear electro-optic coefficient.

4. The apparatus of claim 3, wherein said crystal further comprises a z-cut $LiNbO_3$ crystal.

5. The apparatus of claim 1, wherein said control circuit further comprises:
- a lock-in amplifier for receiving said electrical signal as an input and providing as an output the partial derivative of said signal with respect to said applied potential and
- a signal integrator for receiving the output of said lock-in amplifier as an input and providing as an output a correction signal for adjusting said potential to minimize the absolute value of said derivative.

6. The apparatus of claim 5, further comprising a high voltage amplifier for receiving the output of said signal integrator as an input and providing a high voltage output which is applied to said filter.

7. An apparatus for automatically removing intense, narrowband electromagnetic energy centered at an unknown wavelength $\lambda$ from a broadband beam of electromagnetic energy, comprising:
- an electro-optically tunable Fabry-Perot filter for intercepting the beam, said filter including:
  - an electro-optic crystal having parallel incident and exit surfaces,
  - a first transparent electrode on said incident surface,
  - a second transparent electrode on said exit surface,
  - an incident reflecting layer on said incident surface, and
  - an exit reflecting layer on said exit surface;
- a detector for producing an electrical signal in response to the electromagnetic energy transmitted by said filter;
- a lock-in amplifier for receiving said electrical signal as an input and providing as an output the partial derivative of said signal with respect to said applied potential;
- a signal integrator for receiving the output of said lock-in amplifier as an input and providing as an output a correction signal for adjusting the potential applied to said filter to minimize the absolute value of said derivative; and
- a high voltage amplifier for receiving the output of said signal integrator as an input and providing a high voltage output which is applied across said electrodes.

8. A method of automatically removing intense, narrowband electromagnetic energy centered at an unknown wavelength $\lambda$ from a broadband beam of electromagnetic energy, comprising the steps of:
- placing an electro-optically tunable interference filter in the path of the beam, the transmission of the filter being controllable by the application of an electrical potential to the filter;
- calculating the partial derivative of the electromagnetic energy transmitted by the filter with respect to the applied potential; and
- adjusting the applied potential to minimize the absolute value of the partial derivative and thereby maximize the transmission of electromagnetic energy at the wavelength $\lambda$ by the filter.

9. The method of claim 8, wherein the steps of measuring and adjusting further comprise the steps of:
- using a detector to convert the electromagnetic energy transmitted by the filter into an electrical signal;
- applying the electrical signal as an input to a lock-in amplifier which provides as an output the partial derivative of the signal with respect to the applied potential;
- applying the output of the lock-in amplifier as an input to a signal integrator which provides a correction signal as an output to adjust the applied potential and thereby minimize the absolute value of the derivative; and
- applying the correction signal as an input to a high voltage amplifier, the output of which is applied to the filter to adjust the applied electrical potential.

* * * * *

UNITED STATES PATENT AND TRADEMARK OFFICE

Certificate

Patent No. 4,508,964                           Patented April 2, 1985

On petition requesting issuance of a certificate for correction of inventorship pursuant to 35 USC 256, it has been found that the above-identified patent, through error and without any deceptive intent, improperly sets forth the inventorship. Accordingly, it is hereby certified that the correct inventorship of this patent is William J. Gunning III, John M. Tracy and Emilio A. Sovero.

Signed and Sealed this 29th Day of April 1986.

BRADLEY R. GARRIS,
*Office of the Deputy Assistant Commissioner for Patents.*